US008639640B1

(12) United States Patent
Kadous (10) Patent No.: US 8,639,640 B1
(45) Date of Patent: Jan. 28, 2014

(54) PREDICTION OF INDOOR LOCATION USING DECISION TREES

(75) Inventor: Mohammed Waleed Kadous, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 169 days.

(21) Appl. No.: 13/157,880

(22) Filed: Jun. 10, 2011

(51) Int. Cl.
*G06F 15/18* (2006.01)

(52) U.S. Cl.
USPC ............................ 706/12; 342/451; 455/456.1

(58) Field of Classification Search
USPC .......................................................... 706/12
See application file for complete search history.

(56) References Cited

U.S. PATENT DOCUMENTS

| | | | |
|---|---|---|---|
| 7,508,342 B2 * | 3/2009 | Nelson ........................... | 342/359 |
| 7,706,965 B2 * | 4/2010 | Downs et al. .................. | 701/117 |
| 2005/0208952 A1 | 9/2005 | Dietrich et al. | |
| 2007/0018890 A1 * | 1/2007 | Kulyukin .................. | 342/357.14 |
| 2008/0191934 A1 * | 8/2008 | Baker et al. ............... | 342/357.01 |
| 2008/0258974 A1 * | 10/2008 | Wang et al. .................... | 342/451 |
| 2010/0097269 A1 | 4/2010 | Loidl et al. | |
| 2011/0018732 A1 | 1/2011 | Cho et al. | |
| 2012/0007779 A1 * | 1/2012 | Klepal et al. .................. | 342/451 |

FOREIGN PATENT DOCUMENTS

WO     2010059934 A2    5/2010

OTHER PUBLICATIONS

Yiqiang Chen; Qiang Yang; Jie Yin; Xiaoyong Chai; , "Power-efficient access-point selection for indoor location estimation," Knowledge and Data Engineering, IEEE Transactions on , vol. 18, No. 7, pp. 877-888, Jul. 2006.*

Hayashi, I.; , "An application fuzzy ID3 to wireless Lan access point optimal location problem," Machine Learning and Cybernetics, 2005. Proceedings of 2005 International Conference on , vol. 8, No., pp. 4924-4929 vol. 8, Aug. 18-21, 2005.*

Jaegeol Yim, Introducing a decision tree-based indoor positioning technique, Expert Systems with Applications, vol. 34, Issue 2, Feb. 2008, pp. 1296-1302, ISSN 0957-4174, 10.1016/j.eswa.2006.12.028.*

Oliver and Hand. On Pruning and Averaging Decision Trees. Proceedings of the 12th Intl Conf on Machine Learning, 1995.*

Yu-Chung Cheng, Yatin Chawathe, Anthony LaMarca, and John Krumm. 2005. Accuracy characterization for metropolitan-scale Wi-Fi localization. In Proceedings of the 3rd international conference on Mobile systems, applications, and services (MobiSys '05). ACM, New York, NY, USA, 233-245.*

* cited by examiner

*Primary Examiner* — Jeffrey A Gaffin
*Assistant Examiner* — David H Kim
(74) *Attorney, Agent, or Firm* — Lerner, David, Littenberg, Krumholz & Mentlik, LLP (57) ABSTRACT

Decision trees may be built and executed to estimate an indoor location of a mobile device. In particular, a first attribute (e.g., received signal strength indication (RSSI) of one or more access points) is selected, and variations of that attribute throughout an indoor area are identified. These identified variations are mapped to the locations to generate a model. One or more decision trees are built based on the model, and an output of the decision trees estimates a location of a mobile device within the building. According to one aspect, a plurality of such decision trees may be built, and the outputs provided by the plurality of trees may be averaged to provide a more reliable result. Each of the plurality of trees may vary the attribute being analyzed, data values, or an order in which data is analyzed.

22 Claims, 8 Drawing Sheets

PREDICTION OF INDOOR LOCATION USING DECISION TREES

BACKGROUND

Localization refers to the determination of a location of an object in three-dimensional space. Global Positioning System (GPS) technology is commonly used for localization in an outdoor environment. However, GPS is not as useful for indoor localization because signals from GPS satellites are generally not powerful enough to penetrate most buildings or other structures that create indoor environments.

A more useful tool for indoor localization involves wireless network. For example, wireless network fingerprinting creates a radio map of a given area based on received signal strength indication (RSSI) data from several access points and generates a probability distribution of RSSI values for a given latitude and longitude. Live RSSI values may then be compared to the fingerprint to find the closest match and generate a predicted location. Methods for predicting the location include Hidden Markov, Nearest Neighbor, and triangulation.

BRIEF SUMMARY

One aspect of the technology provides a method for determining a location of a mobile device within an indoor area, comprising storing, in a database, a model indicating variations in a first attribute at different points throughout the indoor area, and building, using a processor, a first decision tree. The first decision tree may include a starting node, at least one intermediate node, and an output node. The starting node may present a first question related to the first attribute, and each intermediate node may present an additional question related to the first attribute. The output node may indicate a given point within the indoor area based on answers to the first and additional questions. According to one aspect, the first attribute may be a received signal strength of an access point, and the first and additional questions may ask whether the received signal strength of one or more particular access points is above or below one or more predetermined values. Moreover, in some aspects, a plurality of decision trees may be built. Results of the decision trees may be averaged. Alternatively or additionally, a similarity of the results of the multiple trees may be used to determine an accuracy of the results.

Another aspect of the technology provides a system for determining a location of a mobile device within an indoor area, comprising a memory storing a model indicating variations in a first attribute at different points throughout the indoor area, and a processor in communication with the memory. The processor may build a first decision tree including a starting node, at least one intermediate node, and an output node. The starting node may present a first question related to the first attribute, and each intermediate node may present an additional question related to the first attribute. The output node may indicate a given point within the indoor area based on answers to the first and additional questions. The first attribute may be a received signal strength of an access point, direction, type of phone, lighting level, time of day, etc.

Yet another aspect provides a system for determining a location of a mobile device within an indoor area, comprising means for storing a model indicating the variations in the first attribute at the different points throughout the indoor area, and means for building a first decision tree. The first decision tree may include a starting node, at least one intermediate node, and an output node. The starting node may present a first question related to the first attribute, and each intermediate node may present an additional question related to the first attribute. The output node may indicate a given point within the indoor area based on answers to the first and additional questions. The system may further comprise means for executing the decision tree to predict the location of the mobile device within the indoor area.

A further aspect of the technology provides a method for predicting location of a mobile device in an indoor area, comprising detecting, using the mobile device, information related to a first attribute of the indoor area, accessing at least one decision tree corresponding to the indoor area, and executing the at least one decision tree using the detected information to predict a location of the mobile device. The decision may include a starting node, at least one intermediate node, and an output node. The starting node may present a first question related to the first attribute, and each intermediate node may present an additional question related to the first attribute. The output node may indicate a given point within the indoor area based on answers to the first and additional questions. Moreover, the method may further comprise accessing multiple decision trees corresponding to the indoor area, executing the multiple decision trees, and determining, based on results of the multiple decision trees, whether the predicted location of the mobile device is accurate.

DETAILED DESCRIPTION

A mobile computing device may be localized in an indoor area based on the strength of wireless network signals accessible in the indoor area from different access points. A survey of the indoor area may be conducted by measuring the strength of the wireless network signals from the different wireless network access points at different locations in the indoor area. The survey may be performed by sampling the wireless network signal strength at carefully recorded positions in the indoor area using a map. Alternatively or additionally, and with the consent of users, data related to the wireless network may be passively acquired through one or more mobile devices which traverse the indoor area over a period of time. In this case, a position of the one or more mobile devices may be estimated using sensors on the device, such as gyroscopes or accelerometers. A model of wireless network signal strength in the indoor area may be constructed based on the survey and/or the passively acquired data. During the survey and the passive collection of data, data collected may be limited to identifiers and signal strengths, and need not contain additional information. For example, information contained in the network traffic or payload data need not be collected, and may actually be removed.

Embodiments of the present technology provide systems and methods of efficiently computing a position of a mobile device in an indoor area using decision trees. For example, the decision trees may be based on the model of wireless network signal strength, and may correlate signal strengths from one or more access points to a position of a mobile device within the indoor area. The decision trees may be stored at a remote server, and downloaded to the mobile device to be executed, wherein an output of the decision tree indicates the mobile device's position. According to one aspect, multiple decision trees may be used, and the outputs of the trees may be averaged to provide a more reliable result.

Figure 1:
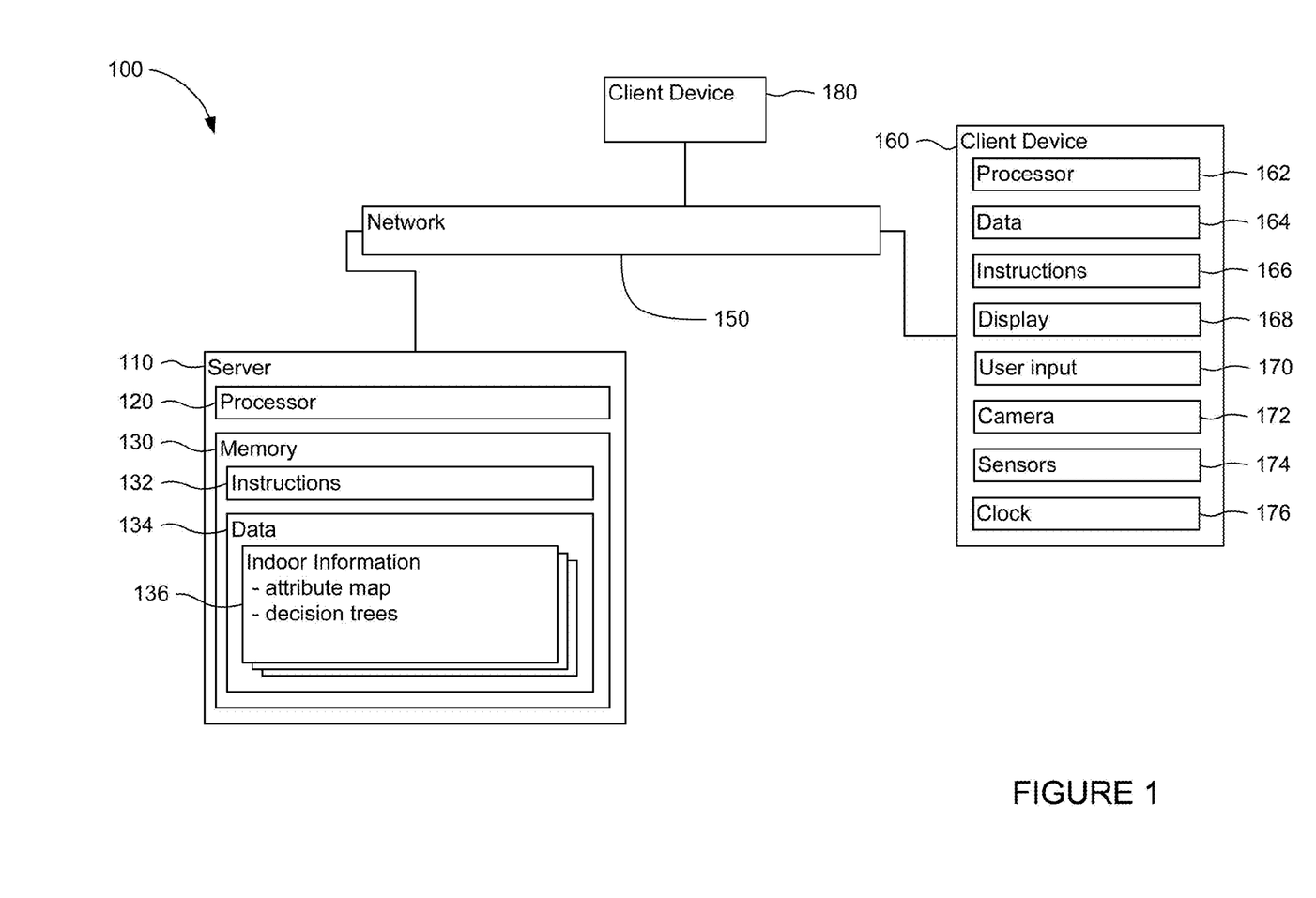
FIG. 1 is a functional diagram of a system according to an aspect of the technology.
Figure 2:
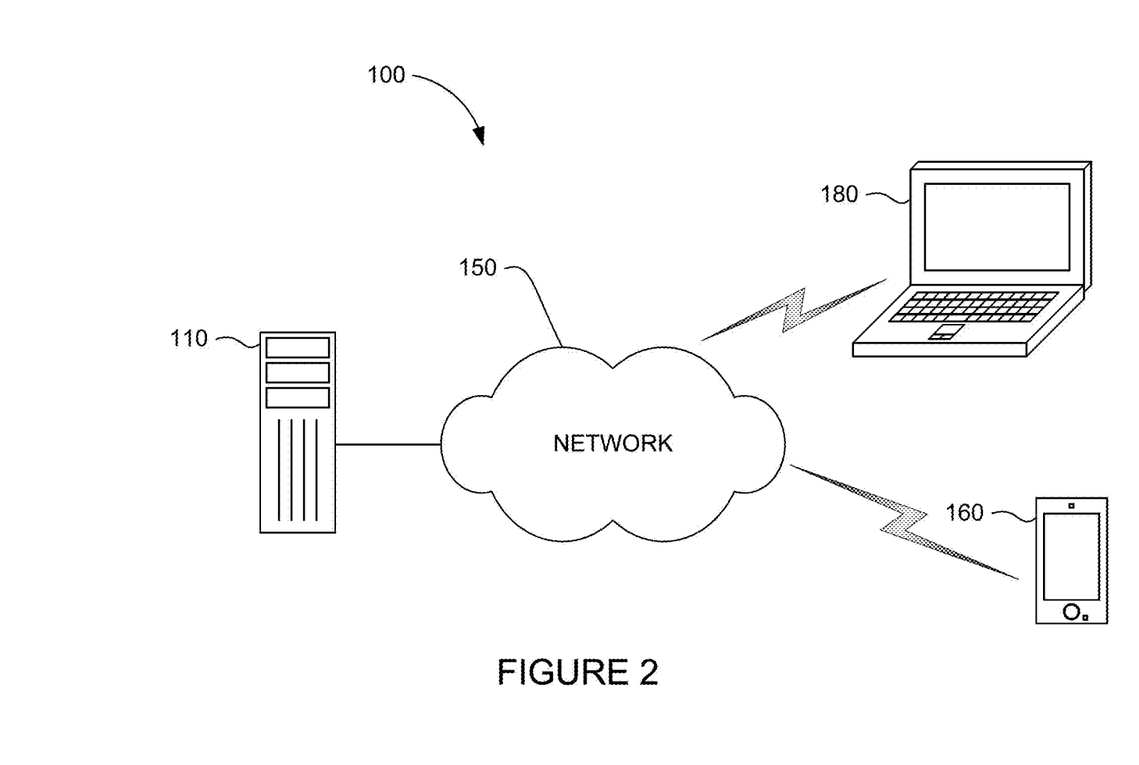
FIG. 2 is a pictorial diagram of a system according to an aspect of the technology.

As shown in FIGS. 1-2, a system 100 in accordance with one aspect of the technology includes a server 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored, or modified by processor 120 in accordance with the instructions 132. For instance, although the architecture is not limited by any particular data structure, the data may be stored in computer registers, in a relational database as a table having a plurality of different fields and records, XML documents or flat files. The data 134 may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 134 may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor 120 may be a dedicated controller such as an ASIC, graphics processing unit (GPU), or other hardware-based processor. Although FIG. 1 functionally illustrates the processor and memory as being within the same block, it will be understood by those of ordinary skill in the art that the processor and memory may actually comprise multiple processors and memories that may or may not be stored within the same physical housing. For example, memory 130 may be a hard drive or other storage media located in a server farm of a data center. Accordingly, references to a processor or computer or memory will be understood to include references to a collection of processors or computers or memories that may or may not operate in parallel.

The computer 110 may be at one node of a network 150 and capable of directly and indirectly receiving data from other nodes of the network 150. For example, server 110 may comprise a web server that is capable of receiving data from client devices 160 and 170 via network 150 such that server 110 uses network 150 to transmit and display information to a user on display 168 of client device 160. Server 110 may also comprise a plurality of computers that exchange information with different nodes of a network for the purpose of receiving, processing and transmitting data to the client devices. In this instance, the client devices 160, 180 will typically still be at different nodes of the network than any of the computers comprising server 110.

Network 150, and intervening nodes between server 110 and client devices 160, 180, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, HTTP and SMTP, and various combinations of the foregoing. Although only a few computers are depicted in FIGS. 1-2, it should be appreciated that a typical system can include a large number of connected computers.

Each client device 160, 180 may be configured similarly to the server 110, with a processor, memory and instructions as described above. Each client device 160, 180 may be a personal computer intended for use by a person, and have all of the components normally used in connection with a personal computer such as a central processing unit (CPU) 162, memory (e.g., RAM and internal hard drives) storing data 164 and instructions 166, an electronic display 168 (e.g., a monitor having a screen, a touch-screen, a projector, a television, a computer printer or any other electrical device that is operable to display information), and end user input 170 (e.g., a mouse, keyboard, touch-screen or microphone). The client device may also include a camera 172, sensors 174 (e.g., position sensors, orientation sensors, accelerometer, gyroscope, light sensors, infrared sensors, etc.), speakers, a network interface device, a clock 176, a battery power supply or other power source, and all of the components used for connecting these elements to one another.

Although the client devices 160, 180 may each comprise a full-sized personal computer, they may alternatively comprise mobile devices capable of wirelessly exchanging data with a server over a network such as the Internet. By way of example only, client device 160 may be a wireless-enabled PDA or a cellular phone capable of obtaining information via the Internet. The user may input information using a small keyboard (in the case of a Blackberry-type phone), a keypad (in the case of a typical cellular phone) or a touch screen (in the case of a PDA).

The client devices may include an antenna and receiver which may be used to scan the Wireless network spectrum and identify local Wireless network signals. For example, the antenna may receive "beacon" messages and send them to the receiver which demodulates the information to identify wireless network access points. In one example, these beacon messages may be IEEE 802.11 management frames transmitted by access points to announce themselves to potential wireless network users. These frames may contain Service Set Identifiers ("SSID") information as well as physical layer parameters that assist devices in connecting to the wireless network. The beacon messages may also include additional network access information which also assists devices in accessing the network, including whether the access point is accepting new users, whether the data is encrypted, and which type of authentication is being used, for example, no authentication (open to all), password based, web-portable based, or Media Access Control ("MAC") address based. However, it will be understood that data collected in accordance with this disclosure may be limited to the information discussed above, for example MAC addresses, SSIDs or other identifiers and signal strengths, and need not contain additional information. For example, information contained in the network traffic or payload data, such as personal information, need not be collected, and in fact, may actually be removed in order to protect the privacy of the wireless network's users.

Data 164 and/or data 134 may include fingerprint data identified through scanning of wireless networks. For example, a client device may traverse multiple positions in an indoor area. At each position, the client device may perform a scan and record MAC addresses and respective signal strength of nearby access points. This data may be used to generate a map correlating the signal strength of the access points with the positions in the indoor area. Fingerprint data may include, alternatively or additionally, information related to other attributes of the indoor area, such as light, temperature, noise, etc.

Figure 3:
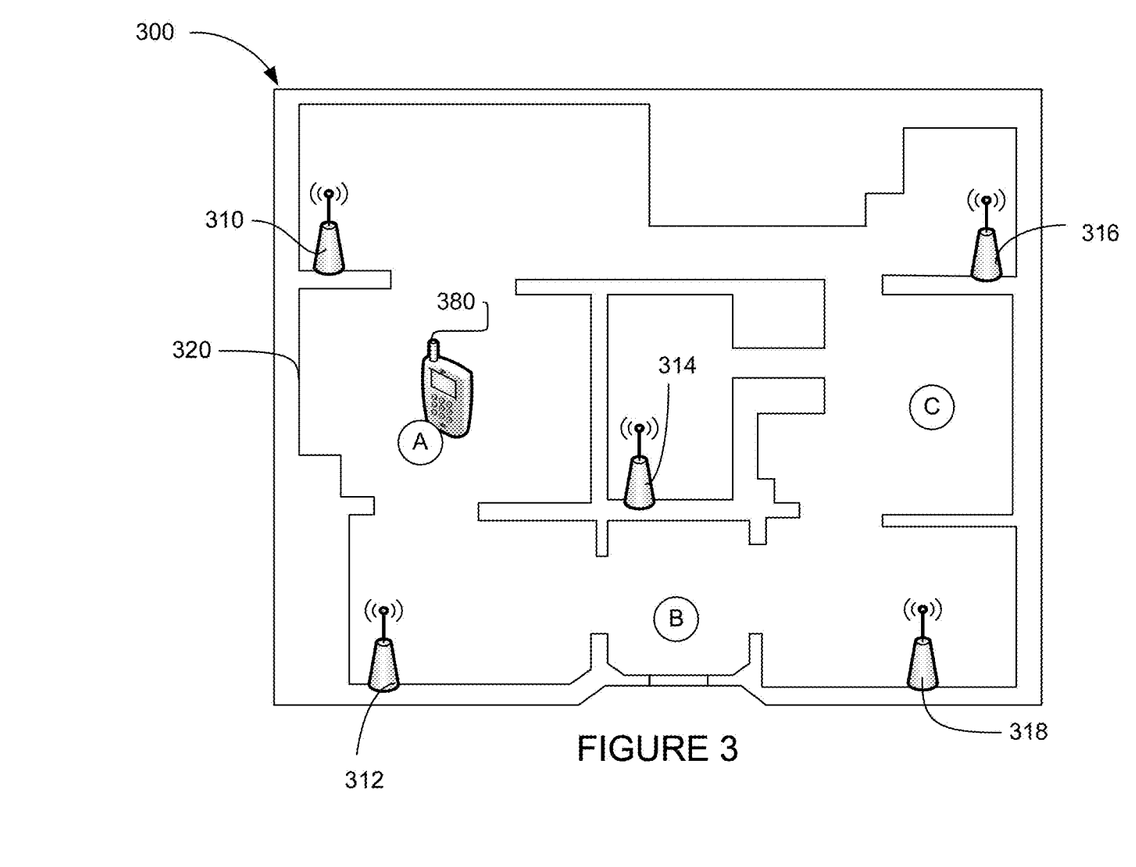
FIG. 3 is an exemplary diagram of a layout of an indoor area according to an aspect of the technology.
Figure 4:
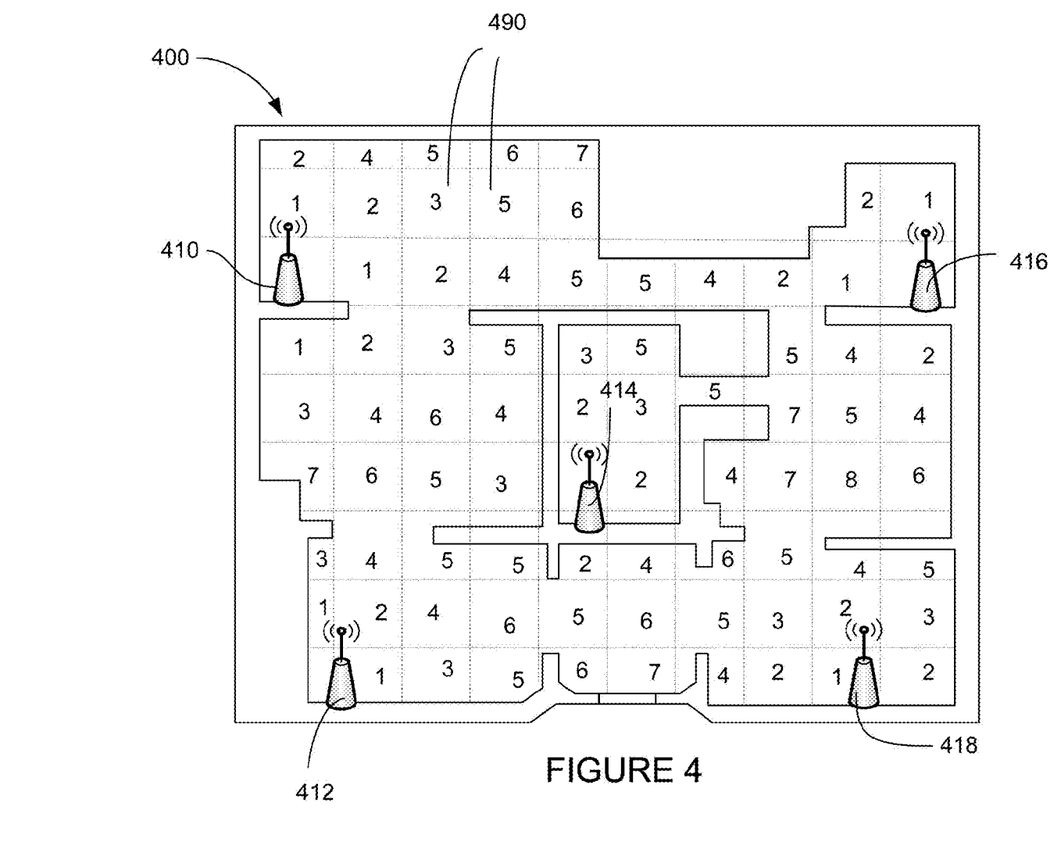
FIG. 4 is an exemplary diagram of an attribute mapping of an indoor area according to an aspect of the technology.

FIGS. 3-4 illustrate an example of a layout of an indoor area, and a mapping of an attribute of the indoor area to various positions therein. In particular, FIG. 3 illustrates an exemplary layout of an indoor area 300. The area 300 includes a plurality rooms separated by walls 320, and a plurality of access points 310, 312, 314, 316, 318 in various positions throughout the indoor area 300. The access points 310-318 my each have a unique identifier, such as a MAC address, and transmit signals for a predetermined distance. The access points 310-318 may be any type of conventional access point, and need not all be the same as one another.

A mobile device, such as the mobile device 380, may traverse the indoor area 300 and assess the signal strengths of the access points 310-318 at different positions. For example, at position A, the mobile device 380 may receive signals from access points 310, 312, and 314. The mobile device 380 may be out of range of the access points 316 and 318 at position A. However, at position B the mobile device 380 may receive signals from access points 312, 314, 318, and at position C the mobile device 380 may receive signals from access points 314, 316, 318. Some of the received signals may be stronger than others. For example, at position A, access point 380 may receive a stronger signal from access point 310 than access points 312, 314, because of its proximity to the access point 310. As the signals are received from the access points 310-318 at the various positions, the received signal strengths at each respective position may be recorded. For example, the signal strengths may be stored on the mobile device 380 and uploaded to the server 110, or they may be dynamically transmitted to the server 110 from the mobile device 380.

Once the signals are recorded, a model or mapping of the signals at the various positions may be generated. For example, FIG. 4 illustrates a mapping 400 of the received signal strengths from access points 410, 412, 414, 416, 418 at various positions throughout the indoor area 300 of FIG. 3. In particular, the indoor area is divided into a number of subsections 490, where each subsection 490 indicates a signal strength of surrounding access points 410-418 at that position. The number in each subsection 490 indicates a signal strength of surrounding access points, wherein lower numbers denote a higher signal strength. The signal strengths at each position may be affected by a distance from the access points 410-418, obstructions between the access point and the position (e.g., a wall), a type of access point, or the like. While only one number is shown, it should be understood that signals from multiple access points may be received at any position. Accordingly, each subdivision may include a set of numbers, where each number corresponds to a different access point (e.g., {418: 2, 414: 6, 416: 8, 412: 9}).

While the signal strength is denoted in FIG. 4 using numbers, it should be understood that any convention may be used (e.g., color-coding). Additionally, the numbers 1-8 in each subdivision are provided for ease of notation. The signal strengths may actually be indicated using a power ratio in decibels (dBm), which may most commonly range from −10 to −90. It should further be understood that the mapping need not be a physical map at all, but may rather be, for example, a table or other listing of positions and corresponding signal strengths. Moreover, while the mapping of FIG. 4 correlates signal strength from the access points 410-418 with different positions throughout the indoor area, it should be understood that any of a variety of attributes may be mapped. These attributes may include environmental factors, such as light, noise, etc., factors related to a mobile device, such as the type or capabilities of the device, factors related to a user, such as a direction the user is facing, or any combination of these.

The subsections 490 may be divided as broadly or narrowly as desired. For example, dividing the subsections 490 to each cover a greater area would result in fewer subsections. Therefore, the mapping may be generated more quickly and easily. However, it may be desired to more finely divide the subsections 490, resulting in a greater number of subsections. This may provide a more accurate report of the received signal strengths at the various positions, and may be used to provide a more accurate prediction of location. According to one aspect, the indoor area may not be divided into subsections at all. For example, positions at which wireless network information is gathered may be explicitly noted.

Figure 5:
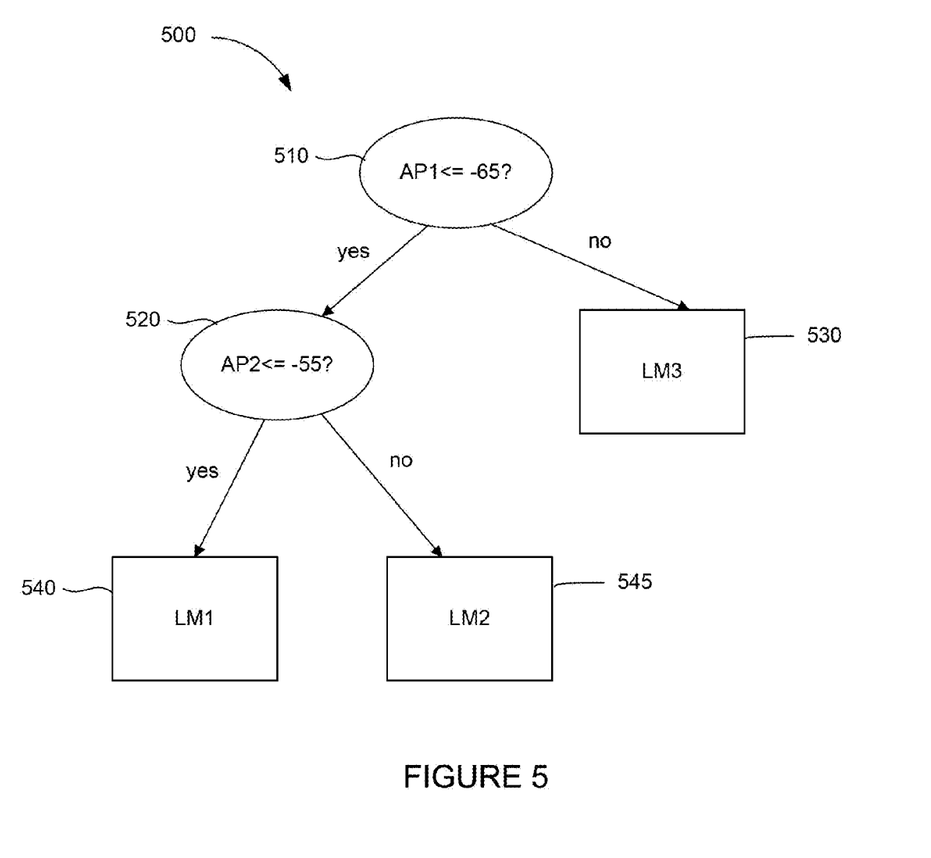
FIG. 5 illustrates a decision tree according to an aspect of the technology.

As shown in FIG. 5, a decision tree 500 may correlate variations in a selected attribute with a position of the indoor area. For example, the decision tree 500 correlates the received signal strengths of access point with a position in an indoor area, as will be described in further detail below.

The decision tree 500 may include a starting node 510, one or more intermediate nodes 520, and one or more output nodes 530, 540, 545. The starting node 510 may present a question, the answer to which determines the next node. For example, the question may be whether a received signal strength of a first access point (AP1) is less than or equal to a particular power ratio, such as −65 dBm. If this is true, the next node may be intermediate node 520, which asks a further question related to the received signal strength from a second access point (AP2). However, returning to node 510, if it is false, the next node may be output node 530.

The output nodes 530, 540, 545 may provide information indicating a position based on the answers to the questions of the starting node 510 and any intermediate nodes (e.g., node 520). For example, the output nodes 530, 540, 545 each indicate one of the equations below, which may be used to calculate location:

$$LM1: LM1\ \text{latitude}=45.124525-0.0043*\text{ap}1+0.0025\ \text{ap}3$$

$$LM2: LM2\ \text{latitude}=45.124888+0.0012*\text{ap}2-0.0042\ \text{ap}3$$

$$LM3: LM3\ \text{latitude}=45.124525-0.0047*\text{ap}1-0.0080\ \text{ap}2$$

According to some aspects, the output may be a longitudinal and/or latitudinal coordinate, a point on a map, or a relative location (e.g., 5' from East wall and 7.5° from North wall of building).

Although only one intermediate node 520 is shown in FIG. 5, it should be understood that any number of intermediate nodes may be included in the decision tree, thereby increasing the potential number of output nodes. Moreover, while the exemplary decision tree 500 indicates a position based on questions related to received signal strength of one or more access points, it should be understood that the questions may relate to any attribute. For example, the questions may relate to a lighting or noise level, or factors related to a mobile device or its user. Even further, the questions may relate to any combination of these attributes.

According to one aspect, multiple decision trees may be generated to more accurately predict a position of a mobile device in an indoor area. For example, the decision trees may analyze various subsets of data, and the outputs from all the decision trees may be averaged. The various subsets of data may include, for example, varying the access points that are analyzed, varying survey data used to build the trees (e.g., if five surveys of an indoor area are available, the decision trees may be built based on four of these), varying the received signal strength values, or a combination of these. Further, some of the decision trees may relate to different attributes, as discussed above.

Figure 6:
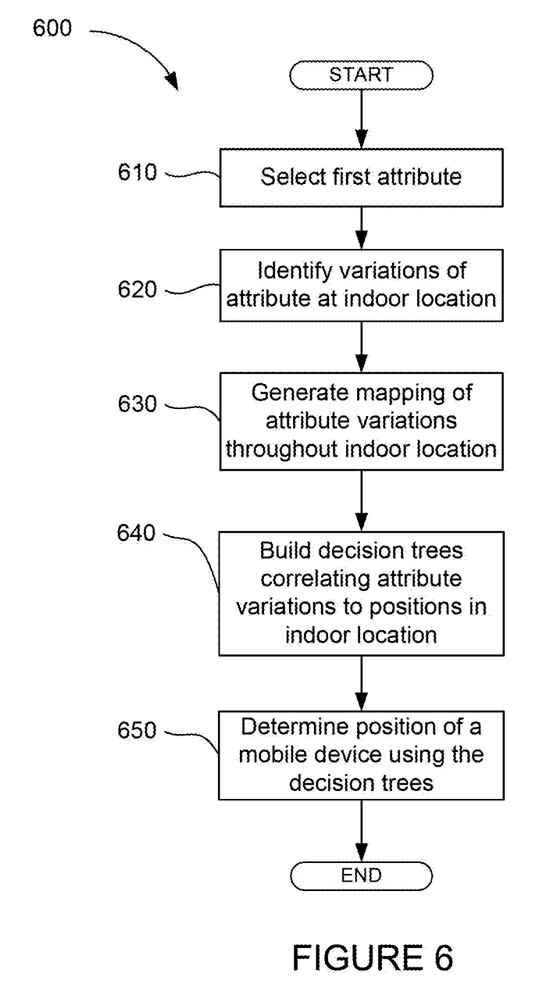
FIG. 6 is a flow diagram of a method according to an aspect of the technology.

FIG. 6 provides a flow diagram of a method 600 according to an aspect of the technology. This method provides for predicting an indoor location of a mobile device using one or more decision trees. It should be understood that the operations of the method 600 do not have to be performed in the precise order described below. Rather, various operations can be handled in a different order or simultaneously, and operations may be added or omitted.

The method 600 begins at block 610, where an attribute for predicting location is selected. The attribute may relate to any aspect of an environment of the indoor area. For example, the attribute may be a received signal strength of one or more access points (e.g., Wi-Fi, Bluetooth, radio, or other access points), a lighting or noise level, or any other hints regarding the environment. The present example assumes that the selected attribute is a received signal strength of Wireless network access points.

Once the first attribute is selected, variations in the attribute throughout the indoor area may be identified (block 620). The variations may be identified, for example, using a mobile device which traverses throughout the indoor area. For example, referring back to FIG. 3, the mobile device 380 may determine that at position A, the received signal strength from access point 310 is −40 dBm, from access point 312 is −45 dBm, and from access point 314 is −60 dBm. Accordingly, these values may be recorded for position A, and this process may be repeated for various other positions throughout the area 300.

The identified variations (e.g., recorded values) may be used to generate a mapping of the attribute variations (block 630), such as the mapping 400 of FIG. 4. The mapping may indicate the variations in any of a number of ways, such as using color/shading, numbers, and/or links to stored data.

At block 640, decision trees correlating the variations in the first attribute to positions in the indoor area may be built. The decision trees, for example, may resemble the decision tree 500 of FIG. 5, and may include a starting node, intermediate nodes, and output nodes. The starting and intermediate nodes may present questions related to the attribute variations. Continuing the present example, these questions may relate to the received signal strengths of the access points in the indoor area (e.g., access points 310-318 of FIG. 3).

According to one aspect of the technology, multiple decision trees may be built to determine a single position. The multiple decision trees may each analyze a different set of data, or may analyze data in a different sequence. For example, the different sets of data may include varying the access points that are analyzed, varying an order in which access points are analyzed, varying the received signal strength values, or a combination of these. Further, some of the decision trees may relate to a second or third attribute. While any number of decision trees may be used, a trade-off between efficiency and accuracy make take place as the number of trees increases. Thus, for example, a given indoor area may be associated with 10-15 decision trees.

In block 650, the decision trees may be used to determine a position of a mobile device within the indoor area. For example, one or more of the decision trees built in block 640 may be executed using signal strengths received by the mobile device as input. These decision trees may be downloaded to and executed on the mobile device, or may be executed remotely.

Multiple decision trees may also be used to determine an accuracy of the predicted location. For example, if the multiple decision trees provide similar estimates of position, it is likely that the estimates are accurate. Conversely, if the multiple decision trees provide widely divergent estimates, the accuracy of the predictions may be much lower.

Figure 7A:
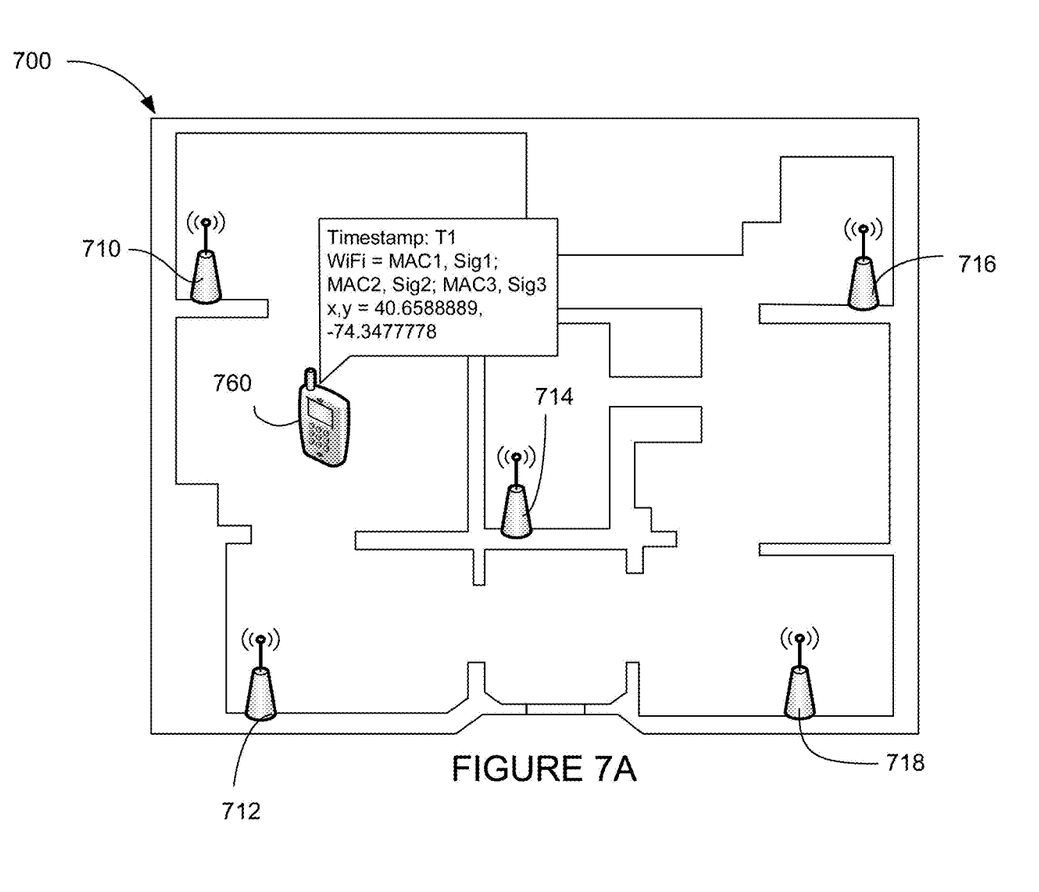
FIG. 7A is an exemplary diagram of a mobile device located within an indoor area according to an aspect of the technology.

FIG. 7A provides an example of a mobile device 760 being located within an indoor area 700. As shown, the indoor area includes access points 710, 712, 714, 716, 718. The mobile device 760 may receive signals from the access points 710, 712, 714, but may be out of range of the access points 716, 718. This information may be input to a decision tree built for the indoor area 700, and the output may indicate a position of the mobile device 760. For example, as shown, the output is indicated as latitude and longitude. However, the position may be indicated in coordinates relative to the indoor area 700, or in any other way. For example, the mobile device 760 may display a diagram of the indoor area 700 on its screen, and its current position may be denoted as a red dot or the like.

Figure 7B:
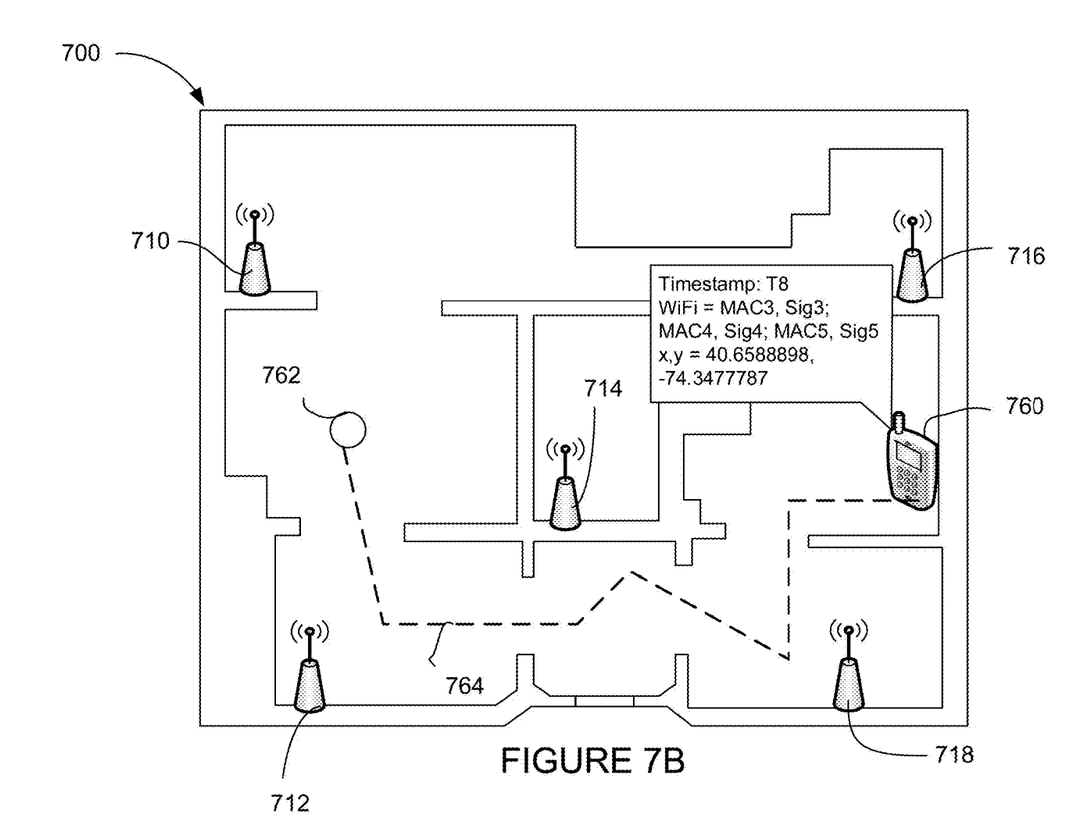
FIG. 7B is an exemplary diagram of a mobile device being tracked within an indoor area according to an aspect of the technology.

According to one aspect, the decision trees predicting the position of the mobile device 760 may be executed periodically or continually to trace a movement of the mobile device 760. For example, as shown in FIG. 7B, the mobile device 760 is traced from starting point 762 along path 764 by executing decision trees at one or more points along the path 764. According to one aspect, the mobile device 760 may store a record of its movements, for example, by recoding each decision tree output along with a timestamp.

Using decision trees to predict a location of a user within an indoor area may be advantageous in that the decision trees do not consume a great deal of resources, they may be executed quickly, and they make choices about which inputs are relevant locally, rather than globally. Additionally, an accuracy of the location predictions made using the decision trees may be increased by executing a plurality of trees and averaging the result.

As these and other variations and combinations of the features discussed above can be utilized without departing from the technology as defined by the claims, the foregoing description of exemplary embodiments should be taken by way of illustration rather than by way of limitation of the technology as defined by the claims. It will also be understood that the provision of examples of the technology (as well as clauses phrased as "such as," "e.g.", "including" and the like) should not be interpreted as limiting the technology to the specific examples. Rather, the examples are intended to illustrate only some of many possible aspects.

The invention claimed is:

1. A method for determining a location of a mobile device within an indoor area, comprising:
   storing, in a database, a model indicating variations in a first attribute at different points throughout the indoor area;
   building, using a processor, a first decision tree including a starting node, at least one intermediate node, and an output node, the starting node presenting a first question related to the first attribute, each intermediate node presenting an additional question related to the first attribute, and the output node indicating a given point within the indoor area based on answers to the first and additional questions;
   building, using the processor, at least a second decision tree, the second decision tree having a similar structure to the first decision tree, including second output nodes indicating points within the indoor area, the second decision tree varying from the first decision tree in that it presents different questions related to the first attribute or in that it presents questions related to a second attribute; and
   comparing the output node from the first decision tree and the second output nodes from the second decision tree.

2. The method of claim 1, further comprising determining, using the processor, one or more equations correlating the variations in the first attribute with the different points throughout the indoor area, wherein the output node indicates which of the one or more equations to execute.

3. The method of claim 2, wherein a result of each equation is a latitude or longitude.

4. The method of claim 1, wherein the first attribute is a received signal strength of an access point, and wherein the first and additional questions ask whether the received signal strength of one or more particular access points is above or below one or more predetermined values.

5. The method of claim 1, further comprising:
   averaging results from the first decision tree and the at least one second decision tree.

6. The method of claim 1, wherein:
   the first attribute is a received signal strength of an access point;
   the first and additional questions ask whether the received signal strength of one or more particular access points is above or below one or more predetermined values; and
   for each of the at least one second decision trees, the predetermined values are varied.

7. The method of claim 1, wherein:
   the first attribute is a received signal strength of an access point;
   the first and additional questions ask whether the received signal strength of one or more particular access points is above or below one or more predetermined values; and
   for each of the at least one second decision trees, the one or more particular access points are varied.

8. The method of claim 1, further comprising:
   storing a second model indicating variations in a second attribute at the different points throughout the indoor area;
   wherein the second decision tree presents questions related to the second attribute; and
   combining results of the first decision tree and the second decision tree.

9. The method of claim 8, wherein the second attribute is one of direction, type of phone, lighting level, and time of day.

10. The method of claim 1, further comprising:
    using the output of the first decision tree to estimate a location of a mobile device; and
    determining, based on a similarity of results of the first and at least one second decision trees, whether the estimated location of a mobile device is accurate.

11. The method of claim 1, further comprising:
    downloading at least one of the first decision tree and the at least one second decision tree to a mobile device within the indoor area; and
    executing the downloaded decision tree to estimate a location of the mobile device.

12. The method of claim 1, wherein the given point indicated by the output node is provided as coordinates relative to a layout of the indoor area.

13. The method of claim 1, wherein the given point indicated by the output node is provided graphically on a display.

14. A system for determining a location of a mobile device within an indoor area, comprising:
    a memory storing a model indicating variations in a first attribute at different points throughout the indoor area;
    a processor, in communication with the memory, operable to:
       build a first decision tree including a starting node, at least one intermediate node, and an output node, wherein the starting node presents a first question related to the first attribute, each intermediate node presents an additional question related to the first attribute, and the output node indicates a given point within the indoor area based on answers to the first and additional questions;
       building at least a second decision tree, the second decision tree having a similar structure to the first decision tree, including second output nodes indicating points within the indoor area, the second decision tree varying from the first decision tree in that it presents different questions related to the first attribute or in that it presents questions related to a second attribute; and
       comparing the output node from the first decision tree and the second output nodes from the second decision tree.

15. The system of claim 14, the processor further determining one or more equations correlating the identified variations in the first attribute with the different points throughout the indoor area, wherein the output node indicates which of the one or more equations to execute.

16. The system of claim 14, wherein the first attribute is a received signal strength of an access point, and wherein the first and additional questions ask whether the received signal strength of one or more particular access points is above or below one or more predetermined values.

17. The system of claim 14, the processor further averaging the results from the first decision tree and the at least one second decision tree.

18. The system of claim 17, wherein:
the first attribute is a received signal strength of an access point;
the first and additional questions ask whether the received signal strength of one or more particular access points is above or below one or more predetermined values; and
for each of the at least one second decision trees, the predetermined values are varied.

19. The system of claim 17, wherein:
the first attribute is a received signal strength of an access point;
the first and additional questions ask whether the received signal strength of one or more particular access points is above or below one or more predetermined values; and
for each of the at least one second decision trees, the one or more particular access points are varied.

20. The system of claim 14, further comprising:
the memory storing a model indicating variations in the second attribute at the different points throughout the indoor area; and
the processor further operable to
combine results of the first decision tree and the at least one second decision tree.

21. A system for determining a location of a mobile device within an indoor area, comprising:
means for storing a model indicating the variations in the first attribute at the different points throughout the indoor area;
means for building a first decision tree including a starting node, at least one intermediate node, and an output node, wherein the starting node presents a first question related to the first attribute, each intermediate node presents an additional question related to the first attribute, and the output node indicates a given point within the indoor area based on answers to the first and additional questions;
means for building at least a second decision tree, the second decision tree having a similar structure to the first decision tree, including second output nodes indicating points within the indoor area, the second decision tree varying from the first decision tree in that it presents different questions related to the first attribute or in that it presents questions related to a second attribute;
means for executing the decision tree to predict the location of the mobile device within the indoor area; and
means for comparing the output node from the first decision tree and the second output nodes from the second decision tree.

22. A method for predicting location of a mobile device in an indoor area, comprising:
detecting, using the mobile device, information related to a first attribute of the indoor area;
accessing a first decision tree corresponding to the indoor area, the first decision tree including a starting node, at least one intermediate node, and an output node, the starting node presenting a first question related to the first attribute, each intermediate node presenting an additional question related to the first attribute, and the output node indicating a given point within the indoor area based on answers to the first and additional questions;
accessing at least a second decision tree, the second decision tree having a similar structure to the first decision tree, including second output nodes indicating points within the indoor area, the second decision tree varying from the first decision tree in that it presents different questions related to the first attribute or in that it presents questions related to a second attribute;
executing the first decision tree and the at least one second decision tree using the detected information; and
determining a location of the mobile device based on the first decision tree and the at least one second decision tree.

* * * * *